(12) United States Patent
Reisen et al.

(10) Patent No.: US 7,998,420 B2
(45) Date of Patent: Aug. 16, 2011

(54) METHOD AND DEVICE FOR PRODUCING VACUUM IN THE PRODUCTION OF POLYESTERS AND COPOLYESTERS

(75) Inventors: Michael Reisen, Frankfurt Am Main (DE); Gerald Kriesche, Rödermark (DE)

(73) Assignee: Lurgi Zimmer GmbH, Frankfurt am Main (DE)

(*) Notice: Subject to any disclaimer, the term of this patent is extended or adjusted under 35 U.S.C. 154(b) by 269 days.

(21) Appl. No.: 12/211,524

(22) Filed: Sep. 16, 2008

(65) Prior Publication Data

US 2009/0105446 A1    Apr. 23, 2009

(30) Foreign Application Priority Data

Oct. 23, 2007  (DE) .......................... 10 2007 050929

(51) Int. Cl.
*C08G 64/00*  (2006.01)
*C08G 63/02*  (2006.01)

(52) U.S. Cl. ........ 422/131; 528/196; 528/198; 528/271; 528/272

(58) Field of Classification Search .................. 422/131; 528/196, 198, 271, 272
See application file for complete search history.

(56) References Cited

U.S. PATENT DOCUMENTS

| | | | |
|---|---|---|---|
| 4,758,650 A | 7/1988 | Schulz Van Endert | 528/308.3 |
| 5,466,776 A | 11/1995 | Krautstrunk et al. | 526/68 |
| 7,084,234 B2* | 8/2006 | Wilhelm et al. | 528/271 |
| 7,153,927 B2 | 12/2006 | Wilhelm et al. | 528/308.5 |
| 2005/0222371 A1* | 10/2005 | Wilhelm et al. | 528/196 |

FOREIGN PATENT DOCUMENTS

| | | |
|---|---|---|
| DE | 101 27 147 | 6/2002 |
| EP | 0244546 B1 | 11/1987 |
| EP | 0685502 B1 | 12/1995 |

* cited by examiner

*Primary Examiner* — Terressa M Boykin
(74) *Attorney, Agent, or Firm* — Roberts & Roberts, LLP

(57) ABSTRACT

The invention relates to a method and a device for producing vacuum in the production of polyesters and copolyesters; unrectified vapors from at least one esterification or transesterification stage is preferably used as a driving medium in gas jet pumps for producing the vacuum in one or more polycondensation stages.

18 Claims, 1 Drawing Sheet

METHOD AND DEVICE FOR PRODUCING VACUUM IN THE PRODUCTION OF POLYESTERS AND COPOLYESTERS

BACKGROUND OF THE INVENTION

1. Field of the Invention

The invention relates to a method for producing polyesters, in particular polyethylene terephthalate (PET), polybutylene terephthalate (PBT), polyethylene naphthalate (PEN), and polytrimethylene terephthalate (PTT), and copolyesters as well as a device for carrying out the method. In particular, it involves a special embodiment of the device and method that relate to reducing pressure and producing vacuum in the reactors and pressure stages used.

2. Description of the Related Art

Multistage methods and devices for producing polyesters and copolyesters are known. A typical representative of such devices is composed, for example, of essentially two esterification reactors and two polycondensation reactors.

In a mixing device, an acid component and an alcohol component—in the case of PET, terephthalic acid and ethylene glycol—are mixed and then supplied to a first esterification reactor. In the production of PET, the reaction occurs there at approximately 240-280° C. and an elevated pressure and is then essentially completed in a second esterification reactor that operates at normal pressure.

The esterification reactors are usually connected to a rectification column, whose purpose is to separate out the large quantities of accumulated vapors, i.e. primarily the water produced during the reaction, from entrained monomer components—particularly ethylene glycol in the production of PET—in order to be able to convey the latter back to the esterification reaction. The gaseous water removed from the top of the rectification column is condensed and part of it is conveyed back into the column in the form of a reflux.

The product of the esterification reaction is then subjected to one or more prepolycondensation steps for further oligomerization. In this way, it is possible to achieve a sufficient viscosity for the final polycondensation, for which a disk ring reactor is often used. In this case, the condensation reactions, i.e. the prepolycondensation, the polycondensation, and final condensation, take place at reduced pressure or in a vacuum, which must be produced by means of vacuum units.

European patent EP 0244546 B1 has disclosed a method for producing high molecular polyester in which the esterification takes place in a two-stage or multistage reactor arrangement and the polycondensation then takes place under vacuum in at least one vacuum reactor. In this instance, the water vapor recovered from the esterification vapors by means of rectification is used as a driving medium for one-stage or multistage vapor jet vacuum units and is also used in fluid form for the condensation of process vapors in the mixing condensers situated after the water vapor jet pumps.

The disadvantage of this method lies in the fact that a part of the diol contained in the vapors of the vacuum stages is sucked in by the water vapor jets and lost. In order to partially counteract this, the condensation of the vapors must take place at very low temperatures. This leads to an increased precipitation of oligomers that clog the piping and the heat exchanger.

According to EP 0685502 B1, the vacuum in the polycondensation reactor is produced by glycol gas jet pumps. The latter are followed by glycol mixing condensers; the operating conditions for these are adjusted so that the glycol is condensed as completely as possible out of the vapors while low boiling reaction byproducts including water remain in the gaseous phase as much as possible and are only precipitated in a final condensation stage. The glycol precipitated in the mixing condensers is used on the one hand, after vaporization, as a driving medium in the gas jet pumps and on the other hand, as a condensation medium in the mixing condensers. The condensate from the last stage can be supplied, either without further purification or after distillation recovery, to the polyester production process, thus preventing excessive reaction byproduct from collecting in the glycol circuit. This method has the disadvantage that energy is required in order to produce the required glycol vapor as the driving medium for the vapor jet pumps.

DE 101 27 147 likewise describes a method for producing polyesters and copolyesters; this document, however, concerns itself solely with improving the part of the method relating to the esterification. The exceptional feature lies in the fact that with a pressure that falls successively from reaction stage to reaction stage, the vapor flows of the individual esterification stages are combined in a separating column and rectified. Since the pressure of the last esterification stage is less than the pressure of the rectification column, the vapors issLuing from the last esterification stage must be compressed to the column pressure. This can be carried out by means of compressors, blowers, or fans, or through the use of unrectified vapors as a driving medium of a vapor jet pump.

SUMMARY OF THE INVENTION

The invention provides a method for producing polyesters and/or copolyesters in a plurality of process stages, comprising one or more esterification or transesterification stages and one or more polycondensation stages, wherein an unrectified vapor from at least one esterification or transesterification stage is at least partially used to produce at least part of a vacuum for one or more following polycondensation stages.

The invention also provides a device for producing polyesters and/or copolyesters, comprising one or more esterification and/or transesterification stages and one or more separating devices connected to them and one or more polycondensation stages, wherein between the esterification stage and/or transesterification stage and the separating device connected to it, the device has equipment for diverting at least part of the unrectified vapor flowing into the separating device from the esterification or transesterification stage, which is in turn connected to vacuum production equipment that is associated with one or more polycondensation stages.

DESCRIPTION OF THE INVENTION

Figure 1:
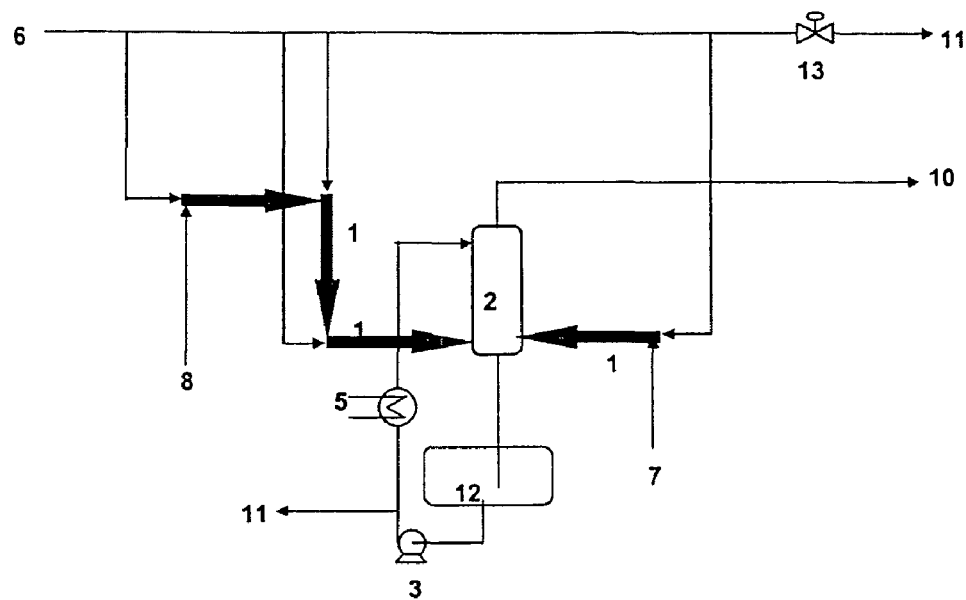
FIG. 1 schematically depicts a vacuum unit for reducing pressure in the prepolycondensation reactor and final reactor, in which the gas jet pumps are operated with unrectified vapors as a driving medium.

The present invention simplifies the methods and devices known from the prior art for producing polyesters and/or copolyesters, improves them from economical and ecological standpoints, and achieves flexibility in terms of process engineering, and in particular to save energy.

The invention provides a method for producing polyesters and/or copolyesters in a plurality of process stages including one or more esterification or transesterification stages and one or more polycondensation stages, in which the unrectified vapor from at least one esterification or transesterification stage is at least partially used to produce at least part of the vacuum for one or more of the subsequent polycondensation stages.

Of particular importance in this context is the use of vapors from esterification stages. It is also possible, however, to use vapors from transesterification stages, their suitability depending to a certain extent on the type of base materials used and thus the percentage of low-boiling components, which are more difficult to condense in a vacuum system.

Known reactors and pressure stages arranged in series are used for the esterification or transesterification; it is irrelevant whether these are combined in a single apparatus or are used as separate units.

In the context of vacuum production, "polycondensation stages" are understood to also mean prepolycondensation and final polycondensation stages. The method feature combinations for vacuum production mentioned above and the device feature combinations for vacuum production mentioned below can, however, also be used in essentially any part of the polyester production process in which a pressure reduction is to be achieved.

In the present method, the polyester or copolyester to be produced is preferably polyethylene terephthalate (PET), polybutylene terephthalate (PBT), polyethylene naphthalate (PEN), or polytrimethylene terephthalate (PTT); both linear and branched polymers can be the subject of the present invention.

It is within the knowledge of an average person skilled in the art that in the production of polymers and copolymers, temperatures and pressures in the individual reactors must be different depending on whether an esterification reaction or transesterification reaction is to take place and depending on the (co)polymer to be produced.

For example in the case of PBT production, all of the pressure stages are normally operated at a vacuum, whereas in PET and PTT production, the first reaction stage is generally operated with a positive pressure, etc. The pressures and temperatures to be used in the individual reactors are extremely well known to those skilled in the art and have been described in extensive detail in a wide variety of reference books, trade journal articles, and patents (e.g. see Schumann, Heinz-Dieter: "Polyester Producing Plants: Principles and Technology;" Die Bibliothek der Technik; Bd. 132; 1990).

The expression "unrectified vapor" refers to a mixture that differs somewhat in accordance with the polyester to be produced. In general, it is understood to refer to the vapor produced during the esterification or transesterification stage before a separation or fractionation in a rectification column.

In esterification reactions, in addition to reaction byproducts, this vapor contains on the one hand, a high percentage of water and on the other hand, a likewise large quantity of the alcohol component from the esterification reaction; the expression "alcohol component" should be understood to mean the bivalent alcohol used as a monomer in the esterification reaction. This diol is to be distinguished from the monovalent alcohol normally split off in conventional transesterification reactions.

By contrast with the vapors from an esterification reaction, the vapors from transesterification reactions are often primarily composed of the alcohol component used as a monomer and the above-mentioned monovalent alcohol (e.g. methanol) produced during the transesterification reaction. Their composition, however, depends on the polymer to be produced and the base materials used, as is known to those skilled in the art.

In most polyester producing processes, the pressure in the first esterification stage is between 0 and 4 bar gauge. The unrectified vapors are therefore well-suited for an economical operation of gas jet pumps, with the driving medium pressure to be adapted to the structure of the vapor jet pump in the way best known to those skilled in the art. Preferably, it is 0.5-3.0 bar, particularly preferably 0.5-2.0 bar.

A device for carrying out the above-mentioned method will be described below.

In particular, this is a device for producing polyesters and/or copolyesters, including one or more esterification and/or transesterification stages, one or more separating devices connected to them, and one or more polycondensation stages; between the esterification stage and/or transesterification stage and the separating device connected to it, the device has equipment for diverting at least part of the unrectified vapor flowing into the separating device from the esterification or transesterification stage, which is in turn connected to vacuum production equipment associated with one or more polycondensation stages.

The expression "unrectified vapor flowing into the separating device" should not be understood to mean only passively flowing vapor, but also vapor that is actively transported, e.g. pumped.

In addition, the term "separating device" refers to any device that can be used to separate out vapors, for example a rectification column, but also a device using partial condensation or another separation method that is based on distillation or makes use of centrifugal forces.

The known vapor diversion equipment normally involves one or more simple piping branch points, with or without one or more pressure control valves.

The vacuum production equipment is preferably embodied in the form of vacuum units equipped with gas jet pumps, preferably in combination with condensers.

The vapor diversion equipment is also preferably equipped with means known to those skilled in the art for controlling the diverted vapor quantity; preferably, these are means for pressure control or quantity control.

The necessity for such a control arises from the fact that the vapor quantity generated by the esterification reaction may vary over time, due to process changes (capacity, pressure, molar ratio etc.) Keeping the pressure of the unrectified vapors used for the vacuum production constant is therefore important, particularly with the use of gas jet pumps as vacuum production means.

The fact that the vapor or a portion of it is not split into its components directly in a separating device, preferably a rectification column, but is instead diverted in unrectified form gives the option to use a markedly greater portion of the energy quantity present in the vapor for generating the vacuums that are required in the various reactors. For vacuum production, the gas jet pumps provided are primarily those in which the vapor can be used as a driving medium.

The method described above is therefore particularly advantageous in the form in which the unrectified vapor used to produce at least part of the vacuum is used as a driving gas in at least two gas jet pumps.

Correspondingly, a preferred embodiment of the above-mentioned device is one in which the equipment for diverting unrectified vapor is connected to vacuum production equipment that has at least two gas jet pumps.

One advantage of using gas jet pumps in this context is their simple design, the accompanying reliability, and a very low degree of wear. Also of considerable significance, however, is the fact that the vapor from the esterification or transesterification reaction, due to its phase (gaseous) and temperature, can be used directly as an energy carrier in the form of a driving medium in these pumps. In addition, when used in association with combustible substances, gas jet pumps are also safer from an operational safety standpoint than other types of pumps, for example those that are electrically driven.

It is also advantageous in the above-mentioned method to produce at least part of the vacuum by means of a plurality of gas jet pumps connected in series with one another, using the unrectified vapor as a driving medium.

The decreasing pressures or increasing vacuums along the reaction path can be achieved by adapting the number of gas jet pumps or multistage gas jet pumps connected in series with one another to the respective pressure conditions. The different pressure in the reactors, i.e. the lower pressure in the final reactor in comparison to the precondensation, for example, calls for various embodiments with regard to the required compression of the respective vapor.

Consequently, one-stage or multistage gas jet cascades, which are preferably adapted to the respective reactor pressure, are used to compress the various vapors to a uniform pressure, thus permitting them to be supplied to a common condensation unit.

In particular, the above-mentioned methods are especially advantageous if the unrectified vapor used to produce the vacuum is subsequently supplied to a separating column.

In general, a significant embodiment of the above-mentioned methods is one in which the unrectified vapors used for vacuum production—generally together with the vapors pumped out of the vacuum stages—are subsequently, i.e. preferably after passing through gas jet pumps, at least partially condensed and/or at least partially supplied to a separating column.

If a portion of the above-mentioned unrectified vapors used for vacuum production is to be supplied to a separating column, then in a preferred embodiment advantageously at least one condenser, preferably a mixing condenser or spray condenser, is provided between the vacuum production means and the rectification column; it is also possible, however, to use other condensers or also several different condensers. An example of an alternative condenser is a scraper condenser. This does not, however, rule out a direct supply into a separating column.

If a portion of the above-mentioned unrectified vapors used for vacuum production is supplied to a condensation, then at least part of the condensed vapor constituents, preferably after passing through a cooling unit, can in turn be used as a condensation medium in condensers, preferably mixing condensers. It is advantageous to eject a portion of the condensed vapor, preferably before entry into the cooling unit, and to supply it in fluid form to a separating column, preferably the above-mentioned rectification column that is connected to one or more esterification reactors.

Consequently, from an equipment standpoint, a preferable one of the above-mentioned devices is one in which at least some of the gas jet pumps are followed by at least one condenser and in particular, an advantageous one of the above-mentioned devices is also one in which the vacuum production equipment is followed by at least one rectification column.

Also, a method of the type described in this application is then of particular significance if the pressure of the unrectified vapor used for vacuum production is kept virtually constant.

A constant pressure of the unrectified vapor used for vacuum production is desirable when this vapor is used as a driving medium in gas jet pumps, because a constant gas jet pump output can only be achieved with a virtually constant preliminary pressure.

In order to achieve a flexibility of the method, the vacuum production through the use of unrectified vapors can be supplemented by means of a second system. This means that a particularly advantageous one of the above-mentioned methods is one in which a portion of the vacuum required in the process stages, preferably polycondensation stages, particularly preferably final polycondensation stages, is produced by one or more gas jet pumps that use an essentially pure diol as a driving gas; the diol is preferably the diol used as an alcohol component in the esterification or transesterification reaction.

It has surprisingly turned out that such a method is not only flexible for example with regard to throughput changes and with the use of a pressure control, but also apart from this, is also accompanied by distinct advantages in terms of energy. It is thus possible to achieve a savings of up to 5% in the required process heat in comparison to a pure glycol jet pump system as described in example 2.

In this second system, the diol is preferably also used as a condensation medium, for example in spray condensers.

In the production of PET, the alcohol component, which is used in the above-mentioned second system operated with diol, is ethylene glycol, i.e. ethylene glycol gas jet pumps are used in the corresponding vacuum unit.

This second system is therefore preferably a circulation system in which the alcohol component is used in a heated form as a driving medium in the gas jet pumps and is used in a cooled form as a condensation medium in condensers.

In the gas jet pumps of the second system, the alcohol component used as a driving medium mixes with the vapors pumped out of the vacuum reactors, is then preferably condensed in condensers likewise operated with the alcohol component, then cooled, and conveyed back into the circuit in order in turn to serve as a condensation medium.

The gaseous portion of the vapors remaining in the condensers, optionally after one or more additional condensations, is finally supplied preferably to the vacuum unit that is operated with the unrectified vapors. The condensation temperature is preferably controlled so that the lower-boiling components remain predominantly in the gaseous phase.

Figure 2:
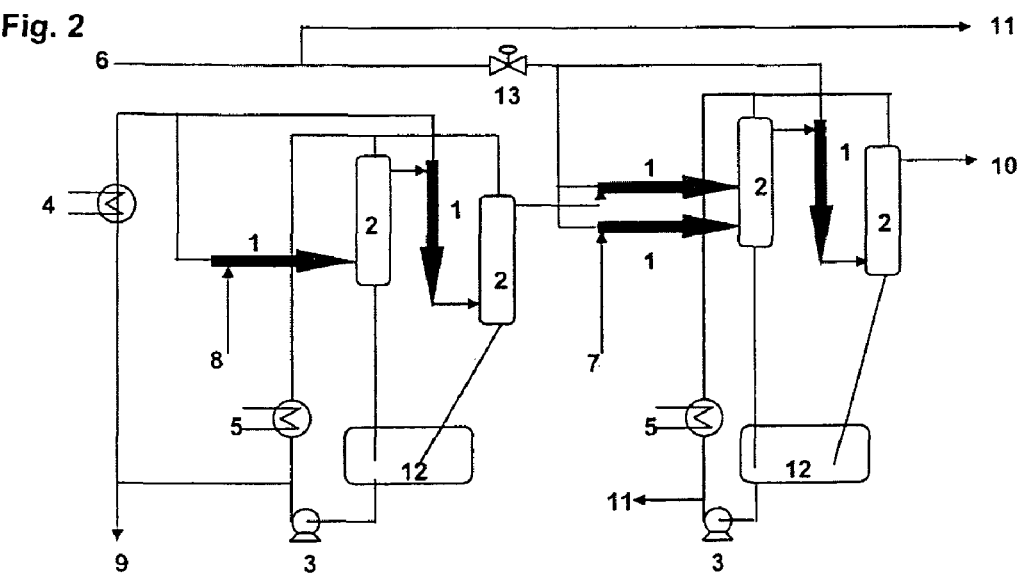
FIG. 2 schematically depicts a vacuum unit for reducing pressure in the prepolycondensation reactor and final reactor, composed of two units or systems; the gas jet pumps of the one unit are operated with an alcohol as the driving medium and the gas jet pumps of the second unit are operated with unrectified vapors as the driving medium.

It is thus preferable if the second system is situated preceding the first system and preferably serves to produce the higher vacuum, i.e. preferably the one in a final reactor, while the first system is used to produce the remaining lower vacuum, i.e. preferably the one in a prepolycondensation reactor. This is illustrated in FIG. 2.

The above-mentioned methods are particularly significant if they provide an at least partial condensation of the vapors from the vacuum stages before said vapors are introduced into the gas jet pumps—i.e. between the reactor and pump. Correspondingly, in a device that is suitable for carrying out such a method, a condenser is connected between the reactor pressure stage and the gas jet pump.

In the context of achieving flexibility, it is useful if the circulation system that is operated with the vapor mixture is also equipped with an activatable evaporator to produce the additional required driving vapor in the event of a breakdown in the supply of the esterification vapor (system startup, malfunction). Alternatively, the diol evaporator of the preceding system can be embodied in a larger form and can be connected to a supply line to the second system, or a diol/water mixture can be obtained from the evaporator of the processing column.

The contents of all of the above-mentioned prior art documents should be viewed as part of this application, it being unnecessary to repeat the knowledge available to those skilled in the art regarding the multitude of methods and devices for polyester production.

The following description of the invention in the form of drawings should in no way be interpreted as a limitation of the invention to the embodiment forms shown.

FIG. 1 schematically depicts a vacuum unit for reducing pressure in the prepolycondensation reactor and final reactor, in which the gas jet pumps are operated with unrectified vapors as a driving medium.

The vapor of the final reactor is conveyed via a supply line 8 either after a precondensation or directly to a three-stage gas jet pump, i.e. three gas jet pumps 1 connected in series, which are operated with unrectified vapors from the supply line coming from the esterification stage 6. After the third gas jet stage, an intermediate condensation is carried out in a condenser 2, for example an injection condenser, at a pressure of 70 mbar or greater. The vapors of a precondensation stage, after a possible intermediate condensation, are supplied via a supply line 7 to the gas jet pumps 1 in which they are brought to the pressure of the (injection) condenser 2. The remaining low-boiling components are further compressed by means of a pump 10, preferably a fluid ring pump, or another vapor jet stage. The condensed mixture is channeled via a collecting vessel 12; part of it is conveyed from there to a cooling unit 5 by means of a pump 3 and once cooled, is conveyed back to the condenser 2 as a condensing medium. Another part of the condensed vapor is supplied via the line 11 to the rectification column. In this column, the fluid is separated into its components, i.e. chiefly water and diol. Both the supply line of the esterification vapor and the jet stages are heated in order to prevent deposits of oligomers.

FIG. 2 schematically depicts a vacuum unit for reducing pressure in the prepolycondensation reactor and final reactor, composed of two units or systems; the gas jet pumps of the one unit are operated with an alcohol as the driving medium and the gas jet pumps of the second unit are operated with unrectified vapors as the driving medium.

The vapor of the final reactor is conveyed via a supply line 8 either after a precondensation or directly to a conventional two-stage diol-operated gas jet pump 1 with intermediate condensation 2 and is compressed to a pressure of approx. 30-40 mbar. Then the remaining vapor is supplied to another gas jet pump 1 that is operated by means of unrectified vapors delivered via a supply line from the esterification stage 6, which conveys the vapor mixture into a condenser 2. Parallel to this, the optionally precondensed vapor mixture of the precondensation stage 7 is brought to the pressure of the condenser 2 by means of an additional gas jet pump 1 that is driven by esterification vapors. The compressed vapor mixture is condensed in the condenser 2 and the remaining gaseous portion is then compressed to approx. 180 mbar by means of an additional gas jet pump 1. The gaseous portion of the vapor remaining after passage through an additional condenser 2 is then supplied to a water ring pump 10. The mixture condensed in the condenser 2 is supplied via a collecting vessel 12 to a supply line leading to the processing column 11 in which diol and water are separated out. The preliminary pressure of the diol/water vapor is adjusted by means of a pressure control valve 13. Both the supply line of the esterification vapor and the jet stages are heated in order to prevent deposits of oligomers. As shown in FIG. 2, 4 is an evaporator, and 9 is a line to recycle the diol to the reactors.

The invention will be explained below in conjunction with several exemplary embodiments; the invention is naturally not limited to the embodiment forms mentioned herein.

Example 1

In a system or method according to the invention for producing PET, the process is composed of four reaction pressure stages:
a first esterification stage, a second esterification stage, a precondensation stage, and a final reactor stage.

A paste-like mixture composed of terephthalic acid and ethylene glycol combined with additional ethylene glycol and a catalyst are supplied into the first esterification stage ES1. At pressures of up to 1800 mbar (absolute), temperatures of 268° C., and for a residence time of approx. 180 minutes, an esterification reaction takes place up to approx. 92% conversion; the water generated in the reaction, together with excess glycol is drawn off in vapor form. In a second esterification stage, the reaction is continued at 1000 mbar and 270° C. for a residence time of approx. 80 minutes up to approx. 97% conversion. After the separation of a partial flow of vapor from the first esterification stage for vacuum production, the vapors of the two esterification stages are supplied to a rectification column, the reaction water is separated out at the top, and the glycol concentrated in the sump of the column is conveyed back to the process.

In a subsequent precondensation at 10 mbar and 273° C. for a residence time of 80 minutes, the conversion is increased to 99.5% and an average molecular weight of about 4,000 g/mol is achieved. The increase to the desired molecular weight of 16,000 to 20,000 g/mol then takes place in the final reactor at 1 mbar and 280° C. for a residence time of approx. 130 minutes. The vapors of the vacuum stages are each partially condensed in a respective spray condenser and then supplied to a vacuum system as shown in FIG. 2.

The vapors of the final reactor are first partially condensed with a spray condenser and then supplied to a two-stage glycol vapor jet, which carries out a compression to approx. 35 mbar.

The vapor of the precondensation stage is partially condensed with the aid of an spray condenser and then supplied to a vapor jet that is driven by the unrectified vapor from the first esterification stage, i.e. with a vapor mixture of approx. 47% water and 53% ethylene glycol and the remaining vapor of the precondensation stage is compressed to approx. 80 mbar. Likewise, the remaining vapor of the final reactor is compressed further to 80 mbar by means of a vapor jet driven by esterification vapor. Then, the remaining vapors from the precondensation and final reactor, together with the driving vapor, are partially condensed in a spray condenser and brought to 180 mbar in an additional compression step in a vapor jet. After an additional intermediate condensation, the compression to atmospheric pressure takes place by means of a fluid ring pump. The condensed vapors are supplied to the rectification column for separation of the water.

Example 2

A comparable process according to the prior art proceeds in a fashion analogous to that of example 1, but with the difference that all of the vapors of the esterification stages are supplied to the sump of the rectification column and the vacuum for the vacuum stages is produced by means of a glycol jet, as described in EP0685502B1. The water-containing condensate of the precondensation stage has glycol added to it in order to dissolve the oligomers and is then likewise supplied to the rectification column.

By contrast with example 1, a method according to example 2 has an approx. 5% greater total energy requirement.

What is claimed is:

1. A method for producing polyesters and/or copolyesters in a plurality of process stages wherein, in a system comprising one or more esterification and/or transesterification stages and one or more polycondensation stages, an unrectified vapor from at least one esterification and/or transesterification stage is at least partially diverted to produce at least part of a vacuum for one or more following polycondensation stages, and wherein said unrectified vapor serves as a driving medium for driving two or more gas jet pumps associated with the one or more polycondensation stages, such that at least part of a vacuum for the one or more polycondensation stages is produced by said gas jet pumps via the driving medium.

2. The method according to claim 1, wherein the gas jet pumps are connected in series with one another.

3. The method according to claim 1, wherein the unrectified vapor used to produce the vacuum is supplied to a separating column after passing through the gas jet pumps.

4. The method according to claim 1, wherein the pressure of the unrectified vapor used for vacuum production is kept virtually constant.

5. The method according to claim 1, wherein an essentially pure diol serves as the driving medium, said diol being the diol used as an alcohol component in the esterification reaction.

6. A multistage device for producing polyesters and/or copolyesters, comprising one or more esterification and/or transesterification stages, one or more separating devices connected thereto, and one or more polycondensation stages, wherein between the esterification stage and/or transesterification stage and the separating device connected thereto, diverting equipment is present which is capable of diverting at least part of an unrectified vapor flowing to the separation device from the esterification and/or transesterification stages, to vacuum production equipment comprising at least two gas jet pumps, which gas jet pumps are connected to said diverting equipment, and which gas jet pumps are associated with one or more polycondensation stages for vacuum production therein.

7. The multistage device according to claim 6, wherein at least one condenser is situated downstream from at least some of the gas jet pumps.

8. The multistage device according to claim 6, wherein at least one rectification column is situated downstream from at least some of the gas jet pumps.

9. The method according to claim 2, wherein the unrectified vapor used to produce the vacuum is supplied to a separating column after passing through the gas jet pumps.

10. The method according to claim 2, wherein the pressure of the unrectified vapor used to produce the vacuum is kept virtually constant.

11. The method according to claim 3 wherein the pressure of the unrectified vapor used to produce the vacuum is kept virtually constant.

12. The method according to claim 2 wherein an essentially pure diol serves the driving medium, said diol being the diol used as an alcohol component in the esterification reaction.

13. The method according to claim 3, wherein an essentially pure diol serves the driving medium, said diol being the diol used as an alcohol component in the esterification reaction.

14. The method according to claim 4 wherein an essentially pure diol serves the driving medium, said diol being the diol used as an alcohol component in the esterification reaction.

15. The multistage device according to claim 6, wherein at least one rectification column is situated downstream from at least some of the gas jet pumps.

16. The multistage device according to claim 6, wherein at least one condenser is situated downstream from at least some of the gas jet pumps.

17. The method according to claim 13 wherein the pressure of the unrectified vapor used for vacuum production is kept virtually constant.

18. The method according to claim 12 wherein the pressure of the unrectified vapor used for vacuum production is kept virtually constant.

* * * * *